United States Patent [19]
Barreira et al.

[11] Patent Number: 5,515,345
[45] Date of Patent: May 7, 1996

[54] CONTROL UNIT FOR AUTOMOBILE AUDIO SYSTEM

[75] Inventors: Jeane K. Barreira, 35D Middlesex Ave., Metuchen, N.J. 08840; Odelio P. Domiciano, Union, N.J.

[73] Assignee: Jeane K. Barreira, Metuchen, N.J.

[21] Appl. No.: 294,630

[22] Filed: Aug. 23, 1994

[51] Int. Cl.$^6$ .............................. H04B 1/20; H04B 1/06
[52] U.S. Cl. ............................... 369/6; 455/345; 455/90
[58] Field of Search .................................. 369/6, 12, 21, 369/69, 75.1, 75.2, 11; 455/77, 89, 90, 344, 346, 345, 347, 352, 355; 379/58, 59, 60, 61, 62, 63

[56]  References Cited

U.S. PATENT DOCUMENTS

| | | | |
|---|---|---|---|
| 2,133,151 | 10/1938 | Rittenhouse | 455/345 |
| 2,374,873 | 5/1945 | McDonald, Jr. | 200/16 A |
| 2,445,031 | 7/1948 | McDonald, Jr. | 455/152.1 |
| 2,452,384 | 10/1948 | McDonald, Jr. | 455/152.1 |
| 2,973,431 | 2/1961 | Sontheimer | 455/152.1 |
| 3,099,797 | 7/1963 | Piccinini | 455/345 |
| 3,799,483 | 3/1974 | Chiappinelli | 248/27.3 |
| 4,100,372 | 7/1978 | Hypolite | 381/1 |
| 4,194,155 | 3/1980 | Harai et al. | 455/345 |
| 4,317,222 | 2/1982 | Bell et al. | 455/77 |
| 4,362,907 | 12/1982 | Polacsek | 455/345 |
| 4,455,454 | 7/1984 | Umebayashi | 379/63 |
| 4,602,358 | 7/1986 | Sato | 369/12 |
| 4,731,769 | 3/1988 | Schaefer et al. | 369/6 |
| 4,818,010 | 4/1989 | Dillon | 296/37.7 |
| 4,905,270 | 2/1990 | Ono | 379/58 |
| 5,086,510 | 2/1992 | Guenther et al. | 455/90 |
| 5,088,108 | 2/1992 | Uddenfeldt et al. | 375/230 |
| 5,093,848 | 3/1992 | Raith | 375/344 |
| 5,146,618 | 9/1992 | Wenner | 455/345 |
| 5,319,803 | 6/1994 | Allen | 455/89 |

Primary Examiner—Ali Neyzari
Attorney, Agent, or Firm—Lerner, David, Littenberg, Krumholz & Mentlik

[57]  ABSTRACT

A control unit for an automobile audio system including a transmitting device mounted in correspondence with a shifter for permitting an operator to have easy access to the control unit so that control over the operation of the audio system may be obtained while the operator's hand is supported on the shifter.

17 Claims, 6 Drawing Sheets

CONTROL UNIT FOR AUTOMOBILE AUDIO SYSTEM

FIELD OF THE INVENTION

The present invention relates to control devices for automobile audio systems. The present invention also relates to audio systems for automobiles which can be controlled by a transmitting device mounted on a shifter used to change gears while operating the automobile.

BACKGROUND OF THE INVENTION

Many attempts have been made towards providing an audio system in which the controls are conveniently arranged with respect to the driver of the automobile. To this end, the prior art has disclosed automobile audio systems and controls at various locations throughout the automobile.

For instance, U.S. Pat. No. 2,452,384 suggests placement of a remote control device in the floorboard of an automobile. U.S. Pat. No. 4,362,907 discloses a radio assembly mounted in an automobile sun visor. U.S. Pat. No. 2,973,431 discloses means for controlling an audio system in an automobile wherein the control unit thereof is arranged in the center of the steering wheel, or on horizontal arms extending from the steering wheel or on an arm arranged for operation by back seat passengers. U.S. Pat. No. 2,133,151 discloses a radio receiving system for an automobile having controls arranged on a vertically extending post between the driver seat and the front passenger seat. U.S. Pat. No. 3,799,483 suggests that it may be convenient to mount an entire radio assembly within the center console of an automobile. Finally, U.S. Pat. No. 4,602,358 discloses a stereo system for an automobile, wherein the controls for the various components of the stereo system are mounted for operation by rear seat passengers.

Each of the aforementioned devices share at least the common shortcoming that the driver of the automobile must move his or her hands to a control unit and take his or her attention from driving in order to look at the controls before actuating the same. Of course, this could cause unsafe conditions because the driver is not concentrating on driving the car, even if only for a moment. The present invention overcomes this shortcoming of the above-described audio systems by providing a control unit for an audio system which is conveniently mounted so that the driver of the automobile need not remove his or her hand from the shifter to operate the audio system. The present invention enables the driver to operate the audio system while concentrating on driving, since he or she will be able to actuate controls with his or her fingers, by knowing where individual controls are, while his or hand is supported on the shifter. Such control is possible while maintaining the hand in the same positions while using the fingers typically used to actuate controls.

SUMMARY AND OBJECTS OF THE INVENTION

One aspect of the present invention pertains to a control unit for an automobile audio system being associated with the shifter. In this aspect of the present invention, transmitting means are provided for transmitting control signals which control the operation of the audio system. The transmitting means are mounted or arranged in correspondence with the automobile shifter, and may include a plurality of actuators which are adapted to be controlled by the driver of the automobile while the operator's hand is supported on the shifter. The control signals are received by receiving means, which may be mounted in the same assembly as the transmitting means or at a remote location such as the dashboard, the trunk or any other location in the car. At least two of the plurality of actuators are adapted to cause different control signals to be transmitted to the receiving means.

Preferably, the transmitting means is secured to the shifter. In this regard, the transmitting means may be either fixed to the shifter, or releasably secured thereto.

In a further preferred embodiment, the control unit may comprise a housing which is secured to the shifter and includes an opening between the shifter and the actuators. In this embodiment, the driver of the associated automobile can rest his or her fingers in the space between the shifter and that portion of the housing which carries the actuators. This permits the driver to rest his hand on the shifter as he is accustomed to doing when there is no control unit on the shifter. When the driver chooses to operate the audio system, he or she can reach the actuators by merely extending his or her fingers to actuate the actuators which will cause the transmitting means to transmit selected control signals to the associated receiving means. The remaining portion of the driver's hand (i.e., palm or between the palm and the wrist) will be supported on the shifter so that the driver can controllably manipulate his or her fingers to find and actuate the actuators. This is unlike the operation of, for instance, dashboard-mounted controls where there is no support for the driver's hands and it is thus more difficult to manipulate the driver's fingers to find the correct buttons without looking at the controls.

Another aspect of the present invention pertains to an entire audio system for an automobile including a shifter as discussed above. The audio system includes transmitting means mounted in correspondence with the shifter for transmitting control signals. The control signals are received by receiving means also mounted in correspondence with the shifter, which permit control of the audio system to be obtained. The transmitting means may include a plurality of actuators arranged to be activated by the driver of the automobile while one of the driver's hands is supported on the shifter. It is preferable for the plurality of actuators to include at least two actuators, each of which are adapted to cause different control signals to be sent to the receiving means.

The actuators may control a minimum of functions or many different functions and may particularly include controls for the volume (including mute for safety purposes), a CD or cassette, an AM/FM selector, specific radio station selection, a lock/unlock control (or controls) which permits the driver to selectively lock-up the actuator controls so that inadvertent actuation will not occur during operation of the automobile (or lock any other actuators, such as those on dashboard-mounted controls to prevent passengers from controlling the system), or any other functions actuators which may be used for controlling an audio system.

The control signals can be of any suitable kind for controlling an electronic device, including infrared signals, electrical signals through hard wiring, etc. The present invention is particularly well-suited for the control of radios, CD, cassette, 8-track or other similar audio systems. However, in another embodiment of the present invention, telephones and other communication systems, or even automated map systems which show street or highway maps, can also be controlled. Thus, for purposes of this application and for east of discussion, the term "audio system" shall encompass such systems.

Of course, the controls provided in accordance with the present invention need not replace other controls (such as dashboard-mounted controls), but instead may be in addition to such other controls. Indeed, other controls might be desirable to permit passengers the capability of controlling an audio system. Also, it may be desirable to provide only a few critical control features on the shifter-mounted controls, while the dashboard-mounted control unit includes all controllable features.

Accordingly, it is an object of the present invention to provide a control unit for an audio system, wherein the transmitting means of the control unit is placed in correspondence or association with a shifter so that a driver of the automobile can easily access the associated actuators without removing his or her hand from the shifter.

It is another object of the present invention to provide a remote-controlled audio system which will enhance the safety of operating an automobile.

These and other objects, features and advantages of the present invention will be clearly understood when read in conjunction with the detailed description and the accompanying drawings which follow.

DETAILED DESCRIPTION OF THE PREFERRED EMBODIMENTS

In a preferred embodiment of the present invention, a shifter 10 for use in an automobile is disclosed. As used in this application, the word "shifter" is intended to include both automatic and manual shifters for changing gears in an automobile. While the preferred embodiments of the present invention are directed to a remote control device mounted on a shifter arranged in the center console of an automobile (i.e., a stick shift), it should be understood that the present invention contemplates use of a control system arranged on shifters mounted in various other places throughout the automobile, such as shifters extending upwardly from the floor board in vehicles that do not include center consoles or steering wheel mounted shifters.

In the preferred embodiment shown in FIGS. 1–5, the shifter 10 includes a shifter head 11 on which the driver of an associated automobile may place his or her hand. The driver will usually grasp the head 11 of the shifter 10 when changing gears in an automobile having a manual transmission or an automatic transmission. For purposes of describing the invention, it will be assumed that the driver is seated on the left side of the automobile. However, it should be appreciated that the present invention can be used in automobiles where the driver is seated on the right side.

Out of habit and for comfort, many people keep their right hand supported on the shifter head 11 after the desired gear has been selected. Thus, as will be more fully appreciated from the following description, the present invention provides a particularly convenient and safe way for the driver of an automobile to control the various functions of an associated audio system.

Figure 1:
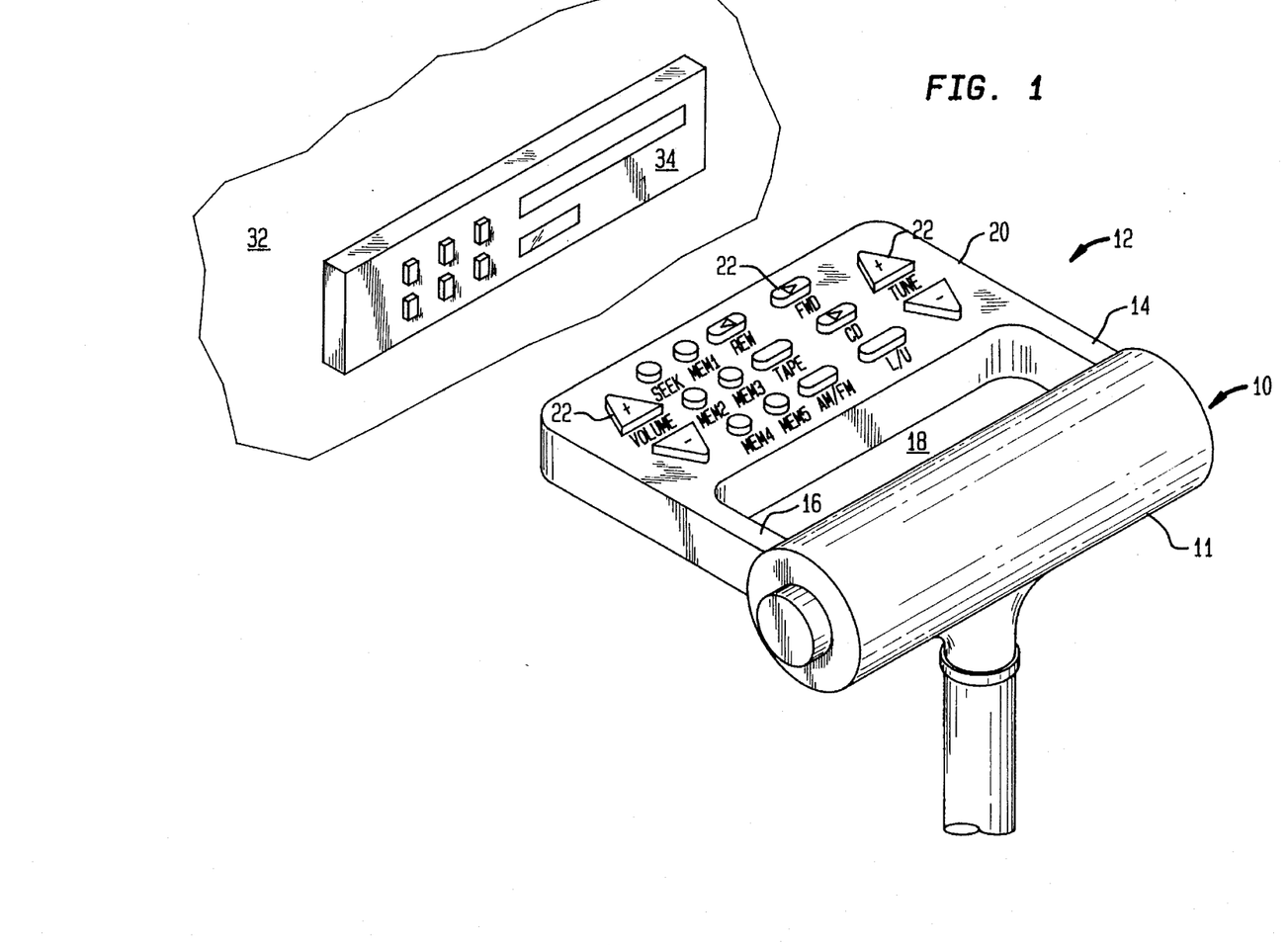
FIG. 1 is a perspective view of one embodiment of the present invention.

As best shown in FIG. 1, part or all of the control unit of the present invention is retained in a housing 12. The housing 12 includes a first connector arm 14 and a second connector arm 16 which are used to secure the housing 12 to the shifter head 11. When the connector arms 14 and 16 are secured to the shifter head 11, an aperture 18 is formed between the housing 12 and the shifter head 11. As will be discussed in more detail hereinbelow, the aperture 18 is adapted to permit the driver of the associated automobile to place his or her fingers in a comfortable rest position when it is not desired to operate the audio system.

Figure 2:
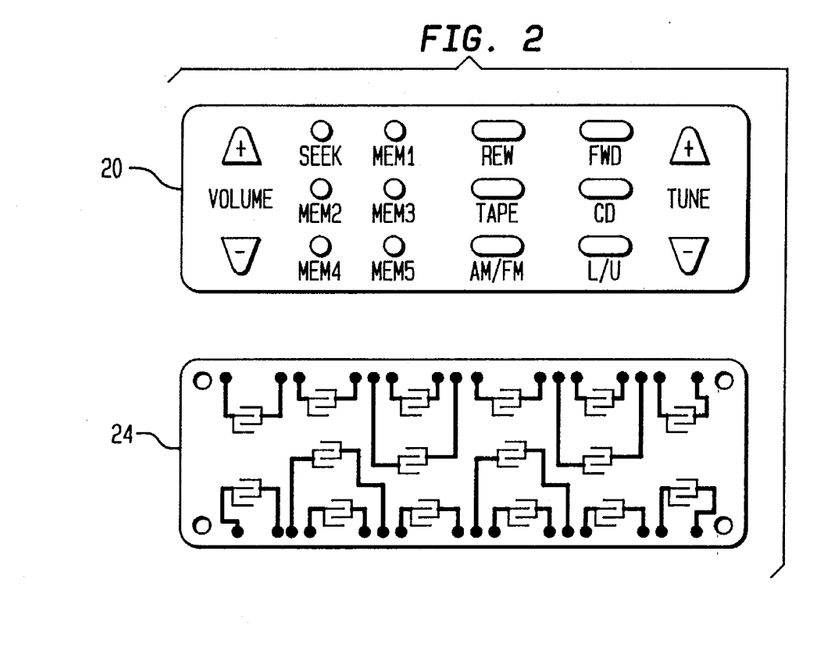
FIG. 2 is a partial exploded view of a portion of the transmitting device shown in FIG. 1.
Figure 5:
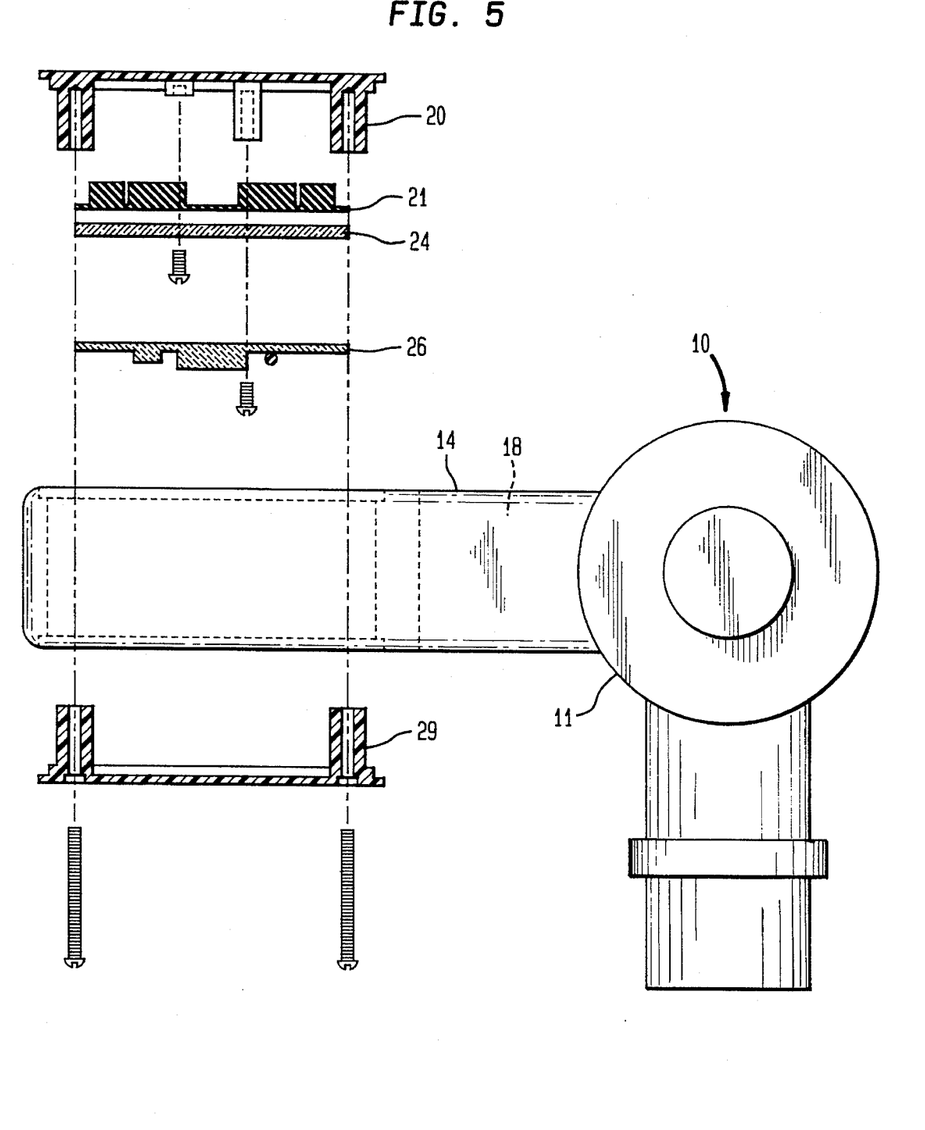
FIG. 5 is an exploded side view of the embodiment shown in FIG. 1.

The housing 12 includes a top cover 20 as shown in FIGS. 1, 2 and 5. When the housing 12 is in its assembled position, the top cover 20 may be mounted on a shoulder 31 of the housing as best appreciated with respect to FIG. 3.

In the preferred embodiment shown in FIGS. 1–5, the housing 12 serves as a container for various components of the transmitter for the control unit of an associated audio system. More particularly, with reference to FIGS. 2 and 4, the components of the transmitter include a keypad 21 which is adapted to be placed partially beneath the cover 20. The keypad 21 includes a plurality of actuator tabs 22 thereon. The actuator tabs 22 can be used to control the various functions of the components of the audio system. In this regard, the components 34 of the audio system may include a CD player, a cassette player, a receiver or tuner, an amplifier, a display screen, a cellular telephone and other components which may be used in advanced audio systems. As will be discussed in more detail below, the actuator tabs 22 are adapted to be depressed in order to actuate various functions of the associated audio components 34. Thus, the actuator tabs 22 may extend from the interior of the housing 20 to the exterior thereof through spaced openings in cover 20. However, in alternate embodiments, the surface of the actuator tabs 22 may be arranged flush against the cover 20, or may be recessed below the cover 20. It should also be appreciated that although the preferred embodiments of the present invention contemplate having a keypad 21 including a plurality of actuator tabs 22, the novel features of the present invention may also be used with embodiments that include a single actuator tab. Such an embodiment may only utilize a power on/off actuator tab and would be adapted to transmit at least two control signals such as an "on" and an "off" signal.

Figure 3:
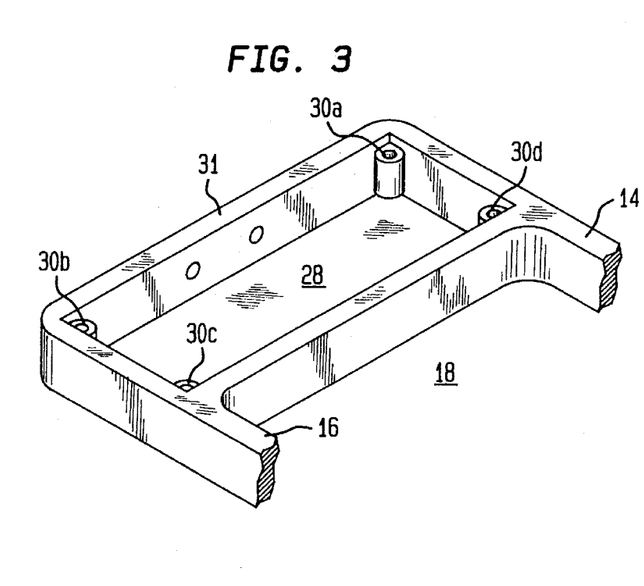
FIG. 3 is a perspective view of a portion of the housing shown in FIG. 1.

Additional components of the transmitter arranged within the housing 12 include a keypad PC board 24 which is retained beneath the keypad 21. A control PC board 26 including various electronic circuit elements for effectuating transmission of the desired signals is arranged beneath the keypad PC board 24 within the housing 12. Each of the components of the transmitter, i.e., the keypad 21, the keypad PC board 24, and the control PC board 26 are retained within a cavity 28 which is formed between the top cover 20 and a bottom cover 29. The various components of the transmitter and the housing 12 are then secured together by any suitable means, such as machine screws, rivets, glue, or the like. When it is desirable to use machine screws for a securing purpose, the housing 12 may include various threaded passageways, such as threaded passageways 30A, 30B, 30C and 30D, as best shown in FIGS. 3 and 5.

The components of the audio system 34, including the receiver and the display panel, may be mounted in the dashboard 32 of the automobile as shown in FIG. 1. However, this arrangement is not a necessary requirement of the present invention. In this regard, the receiver of the audio system can be mounted in the housing 12 along with the transmitter in other embodiments of the present invention besides the embodiment shown in FIGS. 1–5.

The electronic components (not shown) arranged on control PC board 26 will vary according to the desired operating functions of the transmitting device. In the schematic circuit diagram shown in FIG. 4, the circuitry is adapted to transmit signals sufficient to drive an audio system including various components, such as a cassette deck, a CD player, a receiver including an AM/FM tuner, and other components which may be added to the audio system. The electronics are also adapted to permit various stations to be keyed into memory cells.

Figure 4:
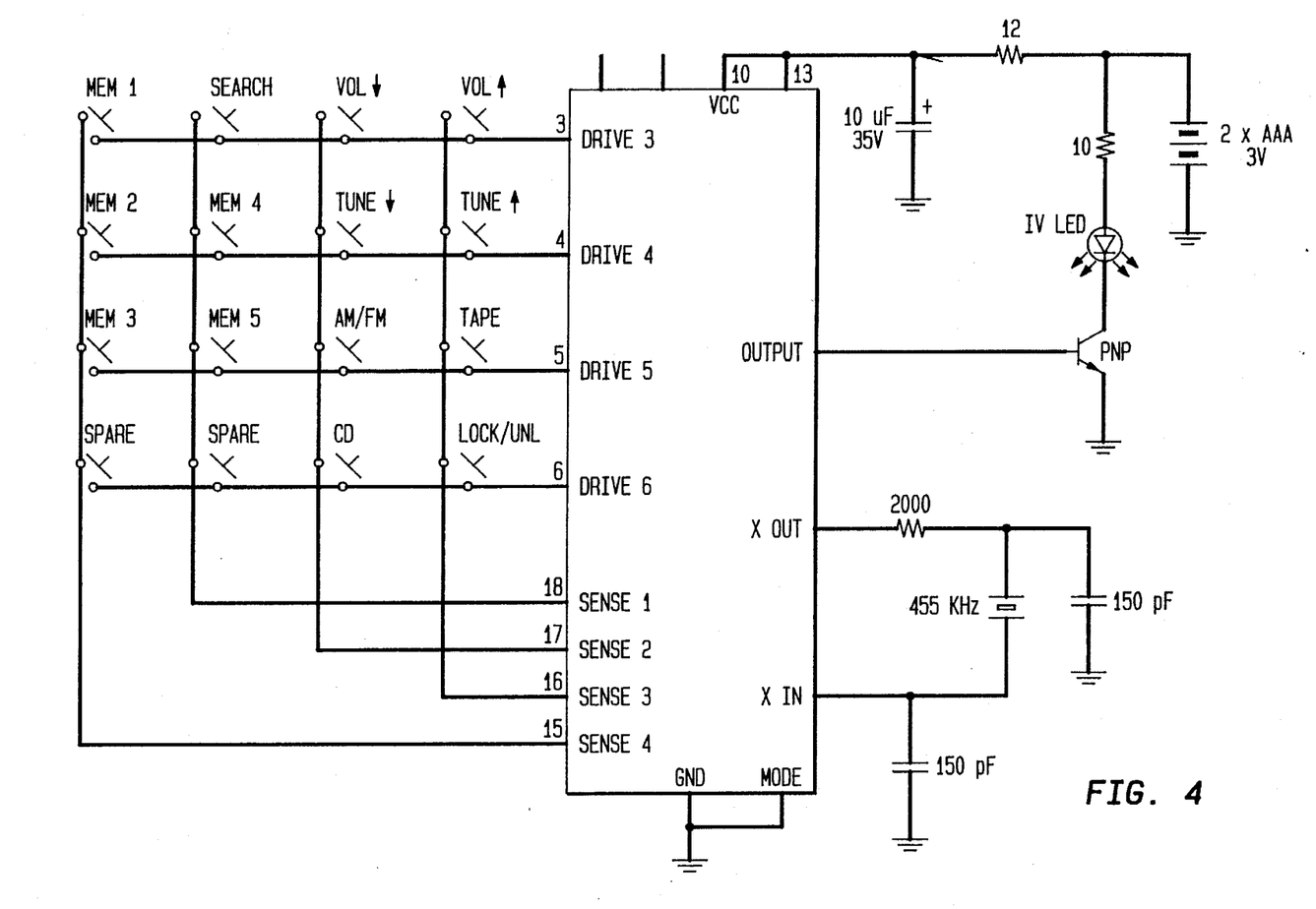
FIG. 4 is a schematic view of the transmitting circuitry of the present invention.

The particular circuitry shown in FIG. 4 may include a 16 pin IC and various other well-known circuit components such as resistors, capacitors, transistors, LEDs, oscillators and the like. The transmitting device may be driven from the electrical system of the associated automobile, and may also include an alternative power source, such as external batteries. It should be appreciated that the control of the receiver of the audio system 34 of the embodiment shown in FIG. 1 may be accomplished by infrared signals sent by the transmitter to the remote receiver location. Alternatively, communication between the transmitter and the receiver of the present invention may be accomplished through other means such as hard-wiring, or through printed circuit technology.

One desirable control feature of the transmitter of the present invention is accomplished by providing a lock/unlock actuator tab 22. Of course, separate lock actuator and unlock actuators can be provided, but it should not be necessary since a single actuator can lock and unlock the system. This feature of the present invention will permit the driver of the automobile to selectively lock-up the keypad and/or other remote controls so that inadvertent actuation of the various control features will not occur while the driver's hand is resting on the head 11 of the shifter 10. When the driver desires to use the audio system, he or she can simply depress the "unlock" actuator tab 22 so that all of the control functions of the transmitter can be selectively actuated.

In operation, the driver will initially place his or her hand on the head 11 of the shifter 10 to place the associated automobile into a drive gear. When operating automobiles including a center console mounted, or floor mounted, shifter, the driver often feels comfortable driving the automobile with his or her left hand on the steering wheel while the right hand is retained on the head 11 of the shifter 10. When operating such an automobile that does not include the control unit of the present invention, it is usually required that the driver remove his or her hand entirely from the shifter head 11 and reach forward to the dashboard 32, or some other remote location, so that the various control functions of the audio system may be selected. In this scenario, it is often dangerous for the driver to attempt to control the various functions of an associated audio system while operating the automobile. However, the present invention overcomes this problem. In this regard, when the driver desires to control the audio system of the present invention, all that is required is that the driver extend his or her fingers from their rest position within the aperture 18 toward the desired actuator tabs 22 which extend through the top cover 20 of the housing 12. Thus, the driver may effectively control the entire audio system by merely extending his or her fingers from the initial rest position, without taking his or her hand off of the shifter head 11.

Figure 6:
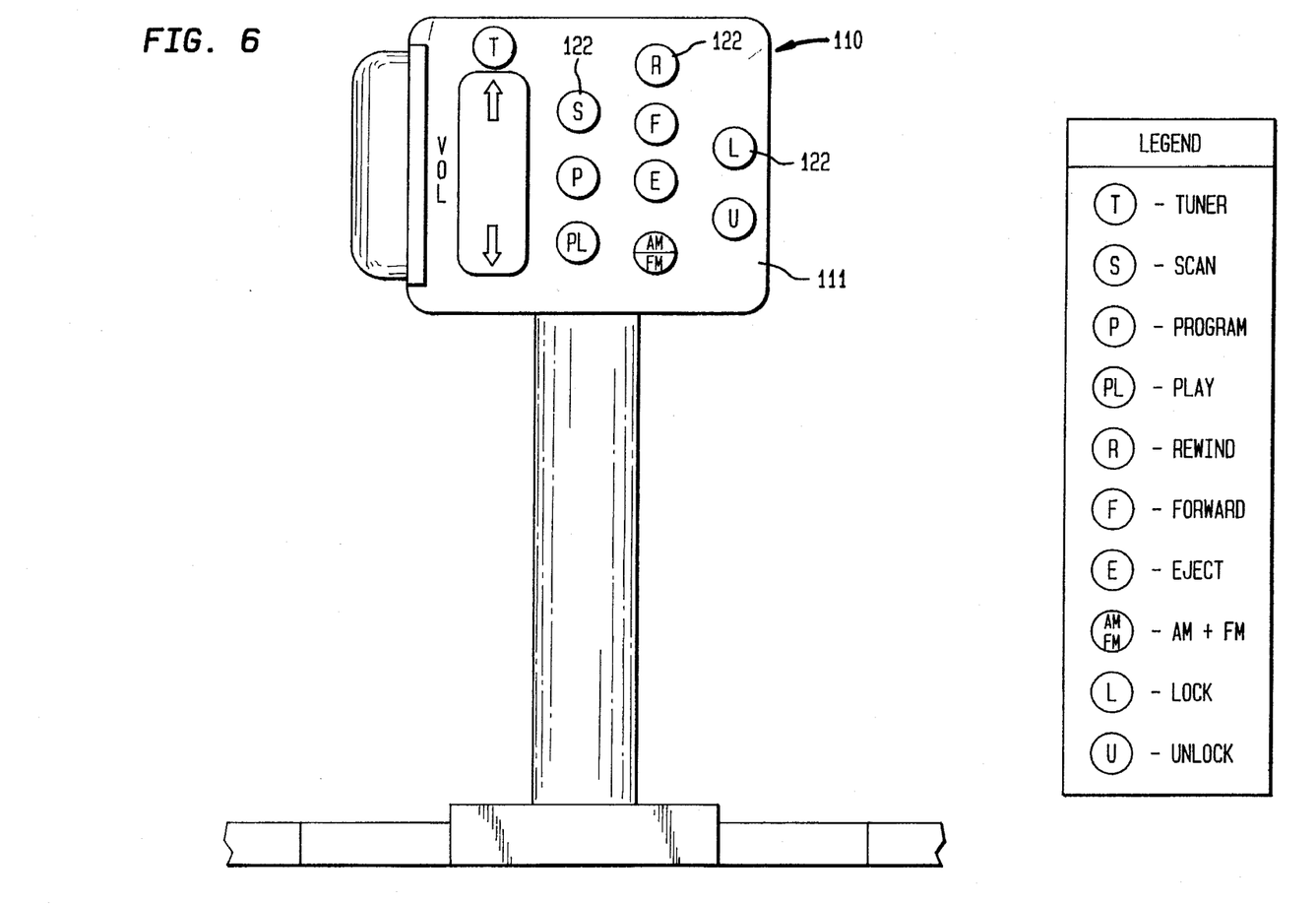
FIG. 6 is a rear view of a second embodiment of the present invention.

The second preferred embodiment of the present invention is shown in FIG. 6 wherein the transmitter is retained directly within a cavity of the head 111 of a shifter 110. In this embodiment, the lock and unlock actuator tabs 122 are particularly important features of the present invention, as the driver is more apt to inadvertently depress one or more of the actuator tabs 122 while changing gears, or while merely resting his or her hand on the shifter head 111.

Figure 7:
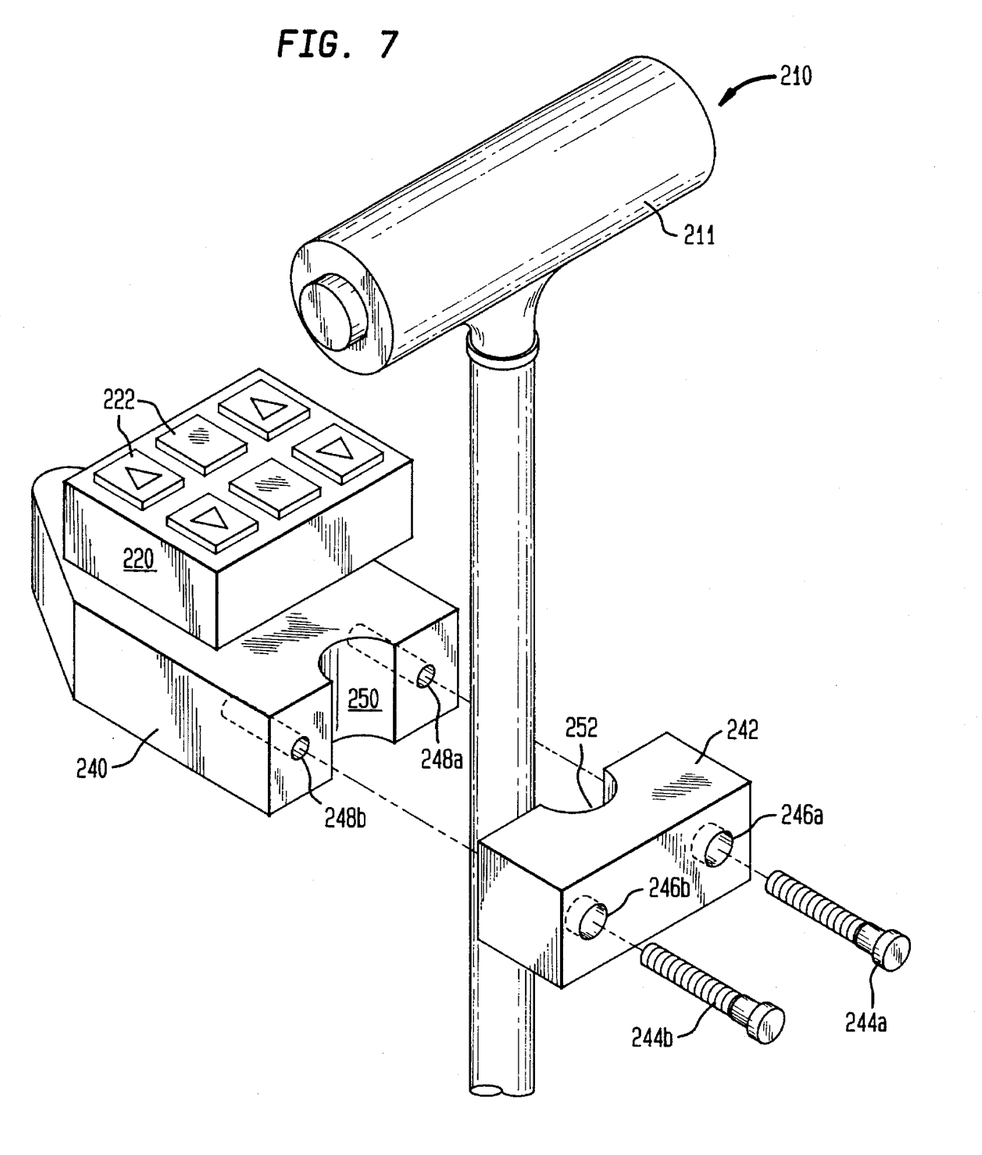
FIG. 7 is an exploded perspective view of a third embodiment of the present invention.

A third preferred embodiment of the present invention is shown in FIG. 7. This embodiment is particularly desirable for those individuals who purchase automobiles that are not initially equipped with the control unit of the present invention mounted on the shifter itself. Thus, the embodiment of FIG. 7 indicates that the control unit of the present invention may be purchased as an after-market device, which can be easily mounted on the stick shift. In this embodiment, the control unit may be mounted at various distances from the head 211 of the shifter 210. As shown in FIG. 7, the control unit is adapted to be secured to the stem of the shifter in the general vicinity of the shifter head 211, but it is not directly secured thereto. This after-market embodiment includes a housing assembly 220 including a plurality of actuated tabs 222 thereon. The housing 220 may be secured to a front half of a removable mounting assembly 240 by various well-known means. This embodiment may also include a rear half of a removable mounting assembly 242 which is adapted to be secured to the front half 240.

To accomplish attachment of the mounting assembly to the stem of the shifter 210, a plurality of threaded screws 244A and 244B may be placed through apertures 246A and 246B which extend through the rear half of the removable mounting assembly along a plane generally transverse to the axis of the stem of the shifter 210 as shown in FIG. 7. The threaded screws may then be received in threaded grooves 248A and 248B, respectively, which extend into the front half of the removable mounting assembly 240. Both the front half 240 and the rear half 242 of the mounting assembly include semi-circular mounting surfaces 250 and 252 respectively, which are sized and shaped to fit around the stem of the shifter 210. Desirably, the housing assembly 220 and thus, the actuator tabs 222 are placed close to the shifter head 211 so that the driver can access the tabs 222 without moving his or her hand an appreciable distance from the shifter head 211.

While the foregoing description of figures is directed toward the preferred embodiments in accordance with the present invention, it should be appreciated that numerous modifications can be made to the various components of the present control unit for an audio system as discussed above. In this regard, such modifications are encouraged to be made in the specific placement, structure, materials and functions of the control unit of the present invention without departing from the novel spirit and scope of same. Accordingly, the foregoing description of the preferred embodiments should be taken by way of illustration rather than by way of limitation, which is defined by the claims set forth below.

We claim:

1. A control unit for an automobile music system in an automobile having a floor mounted gear shifter arranged next to the operator's seat at a central area within an automobile, said control unit comprising: a support section mounted on said shifter for supporting an operator's hand; and transmitting means including a plurality of actuators mounted in correspondence with said support section at said central area within the automobile for permitting the operator to touch selected ones of said plurality of actuators with the operator's fingers while the operator's hand is supported on the support section of said shifter without removing the hand from said support section, said plurality of actuators including at least one locking actuator which locks or unlocks certain other actuators, whereby at least two different control signals can be transmitted to the receiving means for controlling desired operations of the music system.

2. A music system for an automobile having a floor mounted gear shifter next to the operator's seat at a central area within an automobile, said control unit comprising: a support section mounted on said shifter for supporting an operator's hand when shifting gears; transmitting means including a plurality of actuators mounted in correspondence with said support section at said central area within the automobile for permitting the operator to touch selected ones of said plurality of actuators with the same hand placed on the support section of said shifter without removing the hand from said support section whereby control signals are transmitted; and receiving means for receiving said transmitted control signals to control the audio system, whereby at least two different control signals can be transmitted to the receiving means for controlling desired operations of the music system.

3. The control unit of claim 1, wherein said transmitting means is secured to said shifter.

4. The control unit of claim 1, wherein said transmitting means is releasably secured to said shifter.

5. The control unit of claim 1, further comprising a housing secured to said shifter, said plurality of actuators being mounted on said housing, said housing including an opening arranged so that said plurality of actuators mounted on said housing are spaced from said support section of said shifter, whereby an operator's fingers can be placed within said opening when in a supported position while the operator's hand is supported on said support section of said shifter and said actuators can be reached by extension of the operator's fingers so that control signals can be transmitted from said transmitting means.

6. The control unit of claim 5, wherein at least one of said actuators is a locking actuator which locks or unlocks certain other actuators.

7. The control unit of claim 1, wherein at least one of said actuators is a locking actuator which locks or unlocks certain other actuators.

8. The control unit of claim 6 wherein said transmitting means includes infrared transmitting means for transmitting infrared control signals to control the operation of the audio system.

9. The control unit of claim 1 wherein said transmitting means includes infrared transmitting means for transmitting infrared control signals to control the operation of the audio system.

10. The music system of claim 2, wherein said transmitting means is releasably secured to said shifter.

11. The music system of claim 2, wherein said transmitting means is secured to said shifter.

12. The music system of claim 2, wherein said receiving means is mounted in the dashboard of the automobile.

13. The music system of claim 2, wherein said receiving means and said transmitting means are both secured to said shifter.

14. The music system of claim 2, further comprising a housing secured to said shifter, said plurality of actuators being mounted on said housing, said housing including an opening arranged so that said plurality of actuators mounted on said housing are spaced from said support section of said shifter, whereby an operator's fingers can be placed within said opening when in a supported position while the operator's hand is supported on said support section of said shifter and said actuators can be reached by extension of the operator's fingers so that control signals can be transmitted from said transmitting means.

15. The music system of claim 2, wherein at least one of said actuators is a locking actuator which locks or unlocks certain other actuators.

16. The control system of claim 6 wherein said transmitting means includes infrared transmitting means for transmitting infrared control signals to control the operation of the audio system.

17. The music system of claim 2 wherein said transmitting means includes infrared transmitting means for transmitting infrared control signals to control the operation of the music system.

* * * * *